United States Patent

Augustin et al.

[11] B 3,913,812

[45] Oct. 21, 1975

[54] VACUUM GLASS STRIPPING

[75] Inventors: Eugene H. Augustin, Dearborn Heights; Roger E. Johnson, Westland; Thomas L. Rakestraw, Dearborn, all of Mich.

[73] Assignee: Ford Motor Company, Dearborn, Mich.

[22] Filed: June 8, 1973

[21] Appl. No.: 368,392

[44] Published under the Trial Voluntary Protest Program on January 28, 1975 as document no. B 368,392.

[52] U.S. Cl. .................................. 225/2; 225/96.5
[51] Int. Cl.$^2$ ........................................ C03B 33/04
[58] Field of Search ............................. 225/2, 96.5

[56] References Cited
UNITED STATES PATENTS

| | | | |
|---|---|---|---|
| 2,291,451 | 7/1942 | Craig et al. | 225/2 |
| 2,508,017 | 5/1950 | Echter et al. | 225/2 |
| 3,493,155 | 2/1970 | Litant et al. | 225/2 |
| 3,520,456 | 7/1970 | Augustin et al. | 225/2 |

*Primary Examiner*—Frank T. Yost
*Attorney, Agent, or Firm*—Joseph W. Malleck; Keith L. Zerschling

[57] ABSTRACT

A method of cutting and separating portions of a glass bracket, and the apparatus for carrying out the method. The method comprises scoring one surface of the bracket by the use of low pressure, the scoring being carried out to define vents for breaking a continuous trim portion into appropriate segments later in the process. Next, the bracket is indexed to a template cutting station where the surface is scored at other locations to define a continuous glass template inside of said vent scores. Lastly, the scored bracket is supported on a porous member having stress risers arranged congruent or adjacent the various scored locations; the bracket is subjected to the uniform pressure of a membrane drawn uniformly downwardly by vacuum over the top of said bracket causing the bracket to be severed at the template scored locations in advance of severence at the vent scored locations.

7 Claims, 7 Drawing Figures

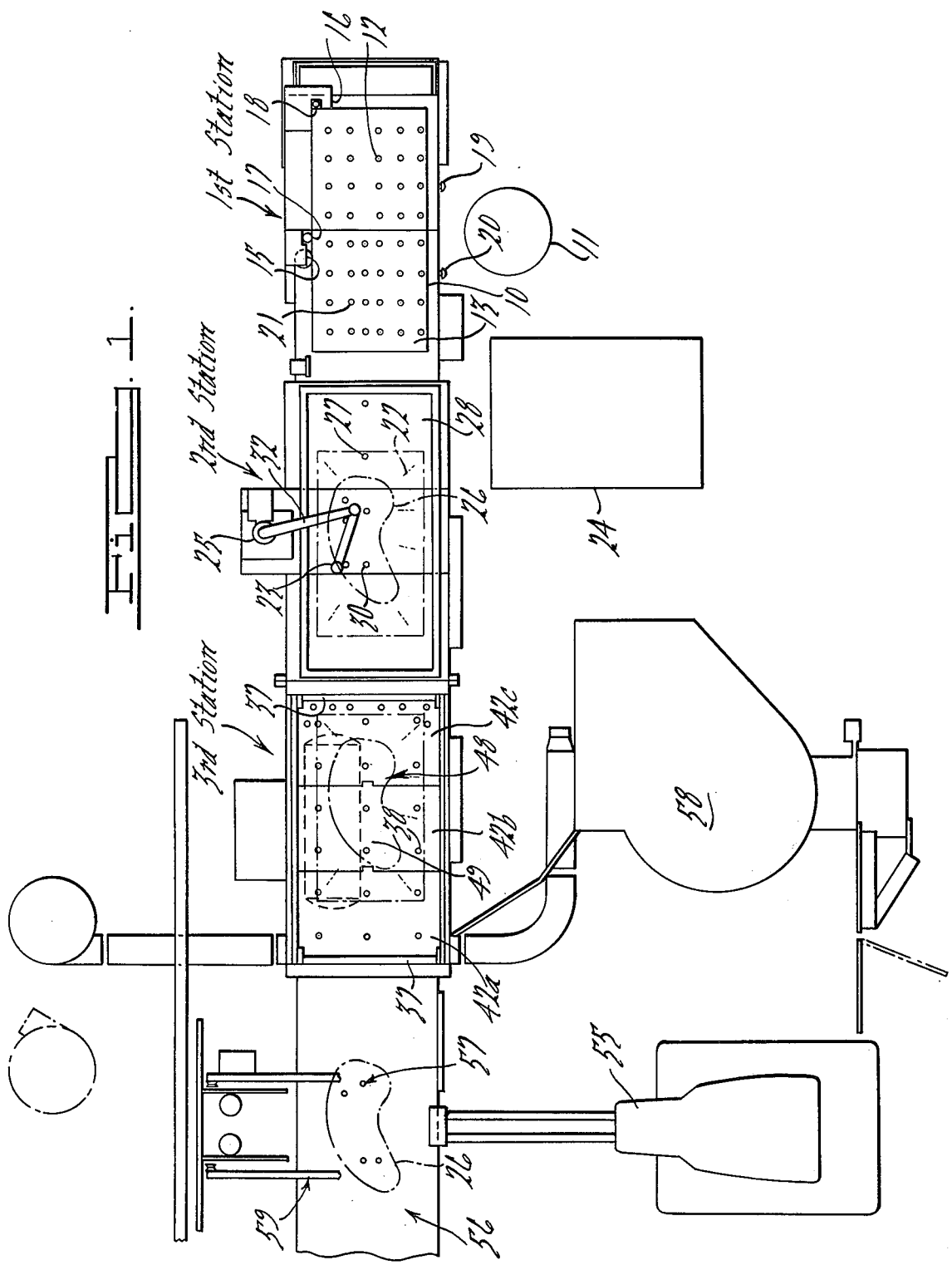

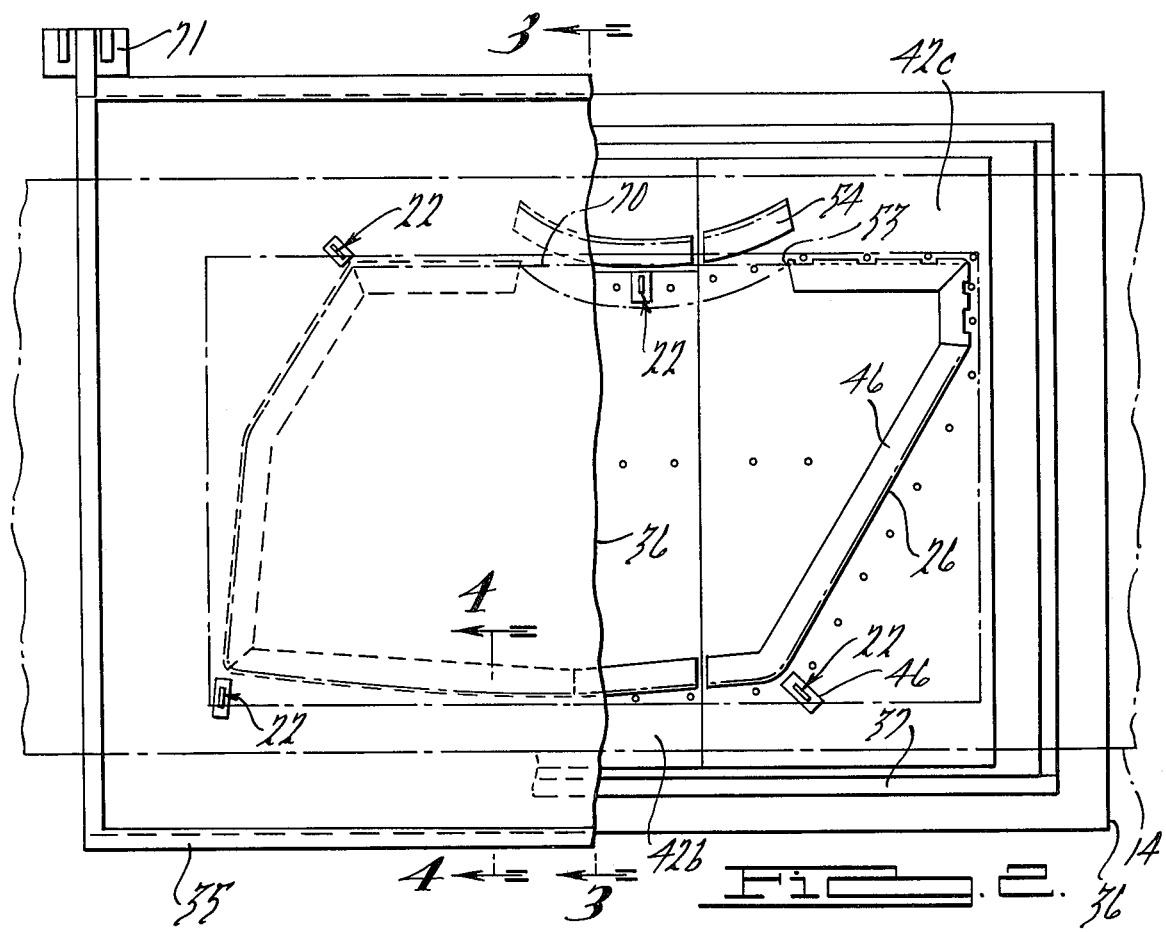
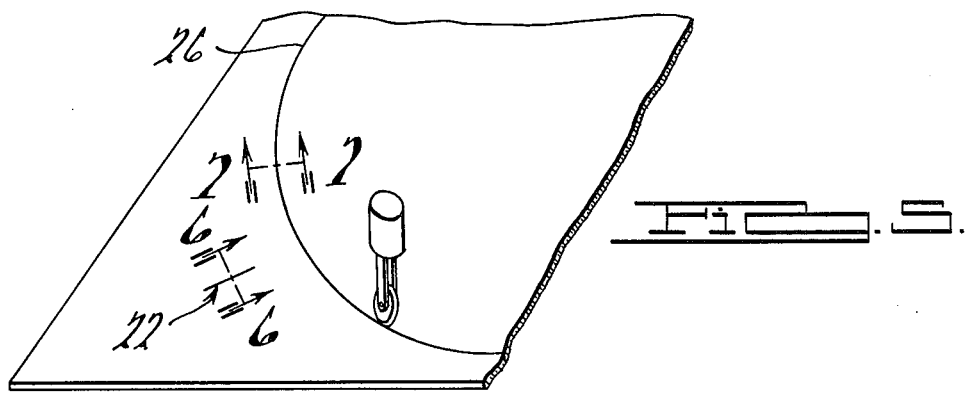
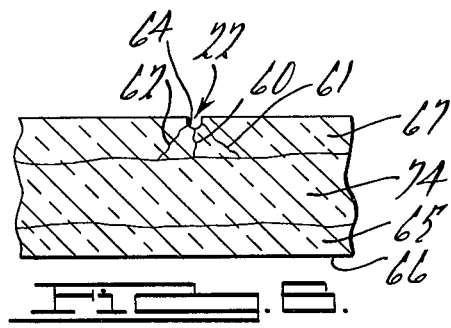
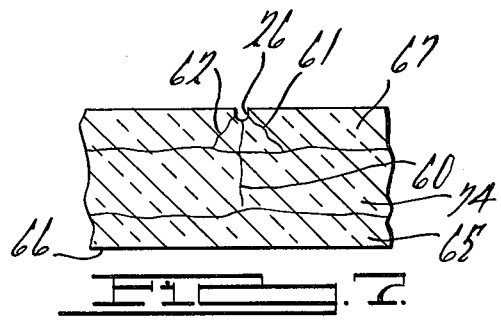

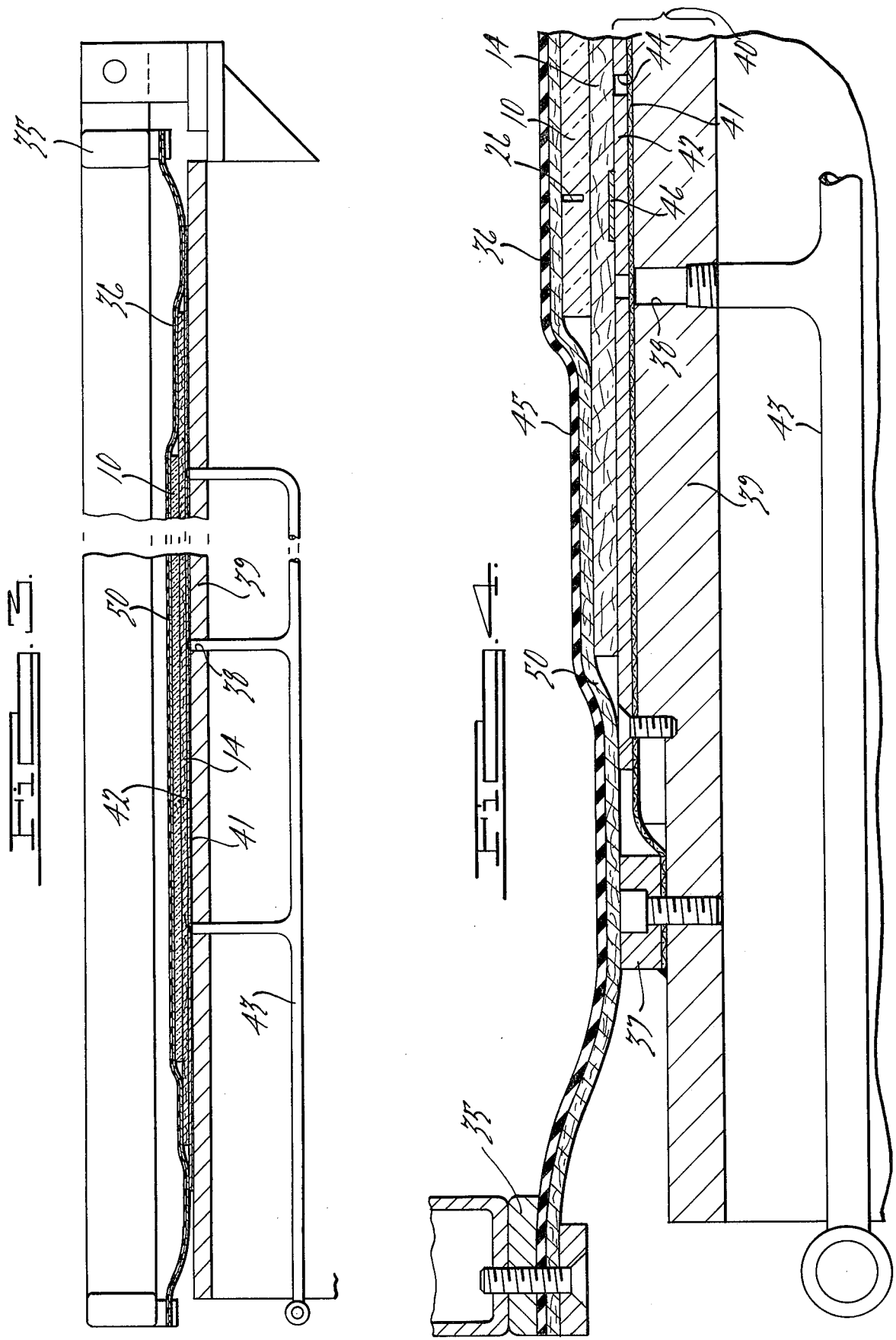

VACUUM GLASS STRIPPING

BACKGROUND OF THE INVENTION

Glass which has been scored to compound configurations for automotive applications, presents an unusual problem with respect to separation of the trim or waste glass material from the glass template to be used. Although the art of cutting glass templates has advanced considerably, the same art has been concerned for some time with the difficulty of stripping waste from the cut template which does not have a high resistance to the formation of chips during such separation. Both during high pressure and low pressure scoring, the glass is provided with fissures which may be of a type to promote chipping and imperfections such as flares in the remaining template.

As is well known in the glass cutting art, the sheet of glass, from which the ultimate piece is cut, is commonly referred to as a glass bracket. The ultimate configuration or shape cut from such bracket is commonly referred to as a glass template. The material which is unwanted as a result of such cutting, becomes the trim material and presents problems in removal since it will often be a continuous annular portion not lending itself to convenient separation solely as a result of the template scoring.

The problem has been approached heretofore principally by relying upon the skill of the operator of the glass cutting and stripping machine. Various mechanical devices have been arranged, but in the last analysis, the mechanical devices must be adjusted and based principally upon the memory (experience), dexterity, visual feedback, and sense of feel of the operator in making such mechanical devices work. It is desirable if such cutting and stripping operation be carried out with greater assurity of precision and in an automated manner that does not rely upon the operator's skill.

SUMMARY OF THE INVENTION

A principal object of this invention is to provide an improved method of automatically stripping trim directly from a template without the occurrence of chips or imperfections that arise from prior art methods. A specific feature of this method is the provision of low pressure scoring or glass cutting in a first station, high pressure scoring or glass cutting along a template line in a second station, and lastly the scored glass bracket is stripped by means of a membrane actuated by a vacuum to be drawn uniformly downwardly against the bracket, the membrane causing the bracket to sever at the high pressure scoring locations in advance of the severence at the low pressure scoring locations. The membrane serves to retain the severed trim pieces in a separated but closely adjacent position to prevent unwanted movement of the various pieces until such time as the membrane is removed.

A specific feature of the apparatus for carrying out the method is the provision of an assembly which is effective to sandwich the scored bracket therebetween including a conveyor means upon which the bracket is riding. The conveyor means is porous and thereby effective to admit vacuum pressure therethrough; the top of the bracket is covered by a flexible pressure membrane effective to be drawn downwardly uniformly by the vacuum pressure penetrating said conveyer means. A supporting means for the sandwiched assembly is utilized and has a vacuum source effective to be distributed to various locations throughout the conveyor means. A particularly important part of the assembly is the use of an interchangeable perforate plate having stress risers thereon in a predetermined pattern, the stress risers facilitate the severence of the trim from the template glass under the influence of the vacuum urged membrane.

BRIEF DESCRIPTION OF THE DRAWINGS

FIG. 1 is a schematic illustration of a preferred method sequence, shown generally in plan view;

FIG. 2 is an enlarged plan view of the stripping station of the preferred method, showing certain portions thereof broken away;

FIGS. 3 and 4 are sectional views taken substantially along lines 3—3 and 4—4 of FIG. 2;

FIG. 5 is a schematic representation of a scoring tool applying a template score, the vent score being previously completed; and FIGS. 6 and 7 represent greatly enlarged views of a portion of a bracket in FIG. 5, taken substantially and respectively along lines 6—6 and 7—7.

DETAILED DESCRIPTION

The present invention is an improvement over the apparatus and method shown in U.S. Pat. No. 3,520,457, the disclosure of the latter being incorporated herein by reference.

The following is broadly divided into a description of the preferred method of this invention, followed by a description of a preferred apparatus useful in carrying out the method, and finally a detailed discussion of the physical parameters important to the control of the method.

Method

In the most essential preferred aspects, the method of this invention provided for cutting and stripping of a glass bracket by the use of three steps carried out in independent stations. The glass bracket is loaded upon a continuous perforate cloth belt (not shown in FIG. 1) at station 1; the belt is subjected to air pressure for floating the bracket thereon. Ease of positioning the bracket during loading is thereby obtained. Upon cessation of the floatation air, the bracket is subjected to a low pressure scoring operation in first locations to provide what is known as vent scores. Next, the bracket is indexed by the belt to a template scoring station (station 2) where a high pressure scoring operation is conducted at second locations. Next, the scored bracket is indexed to a stripping station where a vacuum urged membrane is caused to exert stress at the scored locations. The glass trim is then separated and the template is edge ground and treated in other subsequent steps.

Turning now in particularly to steps of the method:

Step 1. A glass bracket 10 is selected from a dolly 24 and manually positioned by an operator 11 using said floatation air. The floatation air is supplied through a plurality of openings 12 in the bed plate 13 of station 1; the air then passes upwardly through the porous texture of a cotton conveyer belt 14 (not shown in FIG. 1). Air passing through the belt assists in the positioning by operator 11 of the bracket against the back stop 15 and the corner stop 16. When located, the bracket edges contact limit switches 17 and 18 which automatically turn of the floatation air. The operator now actuates the vent cut and circuit controls (not shown) by pushing on button 19. The vent cut apparatus (now shown)

essentially comprises one or more scoring heads supported on a frame, the heads are guides to apply short low pressure straight scores 22 at separated locations, preferably at the bracket margins to facilitate trim breakage (see FIG. 2). Upon completion of the vent cut operation, a signal is sent (by contacting button 20) to the belt index circuit indicating that the load station is clear for indexing the glass bracket to the template cutting or station 2.

The vent cutting frame has an actuating cylinder which is brought into operation by the operator to lower the frame for scoring. Once the operator has activated the frame lowering circuit, there is at least one time delay mechanism that begins. The elapse of the vent score time delay will cause the actuating cylinder to raise the vent cutting frame and energize the up limits (not shown) to return the vent score heads to a raised position.

The bed plate 13 of station 1 contains preferably about 40 (⅛ inches diameter) air floatation holes. The holes are to be supplied by an air feed to a plenum chamber beneath each bed plate. In addition to the air floatation holes, three (5/16 inch diameter) holes 21 are connected to a low level vacuum blower to allow vacuum clamping of the glass bracket to the belt 14 during indexing. The blower for index clamping is preferably provided with a differential of 0.4–0.5 inches of water. Air floatation is preferably provided with a pressure differential of about ½psi.

Step 2. In the second or template cut station, the glass bracket 10 is again vacuum clamped through the index belt 14 and at the same time a cutting head 23 is pneumatically lowered. A cutting oil solenoid valve is also energized to initiate a supply oil for template scoring. When the air pressure in the cutting head reaches a preset level indicating a high pressure contact has been made with the bracket, a pressure switch starts the cutting head drive motor 25 and scoring is accomplished in a predetermined continuous pattern 26. Standard type Klages cutting arms 32 capable of cutting typically large brackets such as 32 inches × 68 inches are employed. A cutting ring 33 acts as a cam against which the cutting head rides to follow the pattern. When the motor stops, air pressure to the cutting head 23 and vacuum clamping is removed simultaneously. Upon completion of scoring, a signal is automatically sent to the belt index circuit indicating the cutting station is clear for indexing the scored glass bracket into the vacuum stripping station.

In station 2, there are three pressure supplies: the vacuum supply for vacuum clamping, a blow-off air supply (for the cutting debris), and a cutting head cylinder air pressure. Four holes 27 are drilled in the bed plate 28 of station 2 to obtain vacuum clamping during belt indexing; in addition four holes 29 are provided to vacuum clamp the bracket during template scoring. When the indexing of the belt has stopped at the template cutting station, the vacuum supply for vacuum clamping and the air supply to the cutting head cylinder, as well as the blow-off air are all energized at the same time. A vacuum switch connected to a sensor hole 30 beneath the belt will insure a bracket is present and allows the cutting head motor to start.

The vacuum switch, which is used to sense the presence of glass in the template cutting station, is preferably connected to a hole 30 (5/16 inch diameter) located midway between two of the vacuum clamping holes and will inhibit the cutting head drive motor unless there is glass or the cutting head pressure has been turned off.

The cutter is lowered before applying high pressure air to the cutting head cylinder itself. This is accomplished by having a flow control valve and a pilot which operates a bypass valve to render a controlled pressure and full pressure (all not shown). Additionally, a pressure switch in the cutting head energizes the drive motor at a preset level pressure. A time delay switch (not shown) is used to energize the release of air pressure to the cutting head and remove the vacuum supply to the vacuum clamping holes at a specific time cycle.

Step 3. When the glass bracket 10 is indexed to the third or stripping station by the conveyor means, a frame 35 holding a neoprene membrane 72 (see FIG. 3) is lowered onto the bracket 10 and onto a seal ring 37 which is located around the four edges of the station bed. Vacuum is now applied through a supporting means 40 particularly comprising a bed plate 39, a distribution member 41, and a stripping sheet or plate 42. Holes 38 in the stripping station bed plate 39 receive vacuum from lines 43 and communicate with the distribution member or spacer 41 (wire mesh) located between the bed plate and the stripping sheet 42. Through holes 44 in the stripping sheet and leakage around the periphery of the stripping sheet, the vacuum pulls the membrane and peripherally seals down onto the seal ring 37. As evacuation takes place, atmospheric pressure against side 45 of the membrane, forces the bracket into intimate contact with the conveyer belt 14 such that stress risers 46, on the stripping sheet, create stress and cause the template scores to open first and then the vent score. The trim 48 will be held by the membrane close to but not connected to the template 49. Upon completion of stripping, the vacuum supply is vented to atmosphere and the membrane frame 35 is raised to clear the glass template and belt. As soon as the frame is raised, a signal is automatically sent to the belt index circuit indicating the stripping station is clear for indexing to a removal station.

In the vacuum stripping station, there is low pressure template clamping during indexing and one vacuum supply to the stripping sheet and bed plate. The membrane assembly, in the down position, will activate the vacuum supply to the stripping sheet and bed plate. A vacuum switch connected to a sensing hole in the bed plate outboard of the belt will shut off the vacuum supply and will activate a time delay to vent the station to atmospheric pressure. After the elapse of time, the membrane assembly is raised and the frame up-limit is energized. The vacuum pressure required to strip a scored template in the vacuum stripper is approximately 8 inches of mercury. The system, as shown, preferably has a vacuum pump capacity of 16 cubic feet per minute at 1,800 rpm to satisfactorily fulfill the requirement.

Subsequent steps. Although not of prime importance to the invention herein, a stripped bracket may be processed subsequently in accordance with conventional operations. Preferably, the stripped bracket may arrive in a preposition station 56 downstream of the stripping station; the template 26 is elevated to a position above the trim by a mechanism 57 having fingers. The cut template is thus in a position for pick-up by an automatic handling device 55 (robot) where it is retracted, rotated and is caused to enter a grinding machine 58 for edge preparation. The handling device 55 at the same time picks up a previously ground template and returns it to an elevated conveyer 59 for transfer to another line for washing and final inspection.

Stripping Apparatus

The flexible neoprene membrane 72 has a porous canvas belt 50 attached thereto to afford durability. The supporting means, comprised of a solid bed plate 39 and stripping sheet 42 can each be considered a porous member. The bed plate is of heavy steel material (typically about 0.75 inch thickness). The thickness of the stripping sheet 42 and the wire screen 41 (located beneath the stripping sheet) add height to the bed plate for contacting the belt 50. Such elevation provides a smooth transition for the belt 14 and glass 10 entering and leaving station three; a continuous flat surface for sealing purposes is obtained with ring 37. Joints 52 between the thick bed plate and ring 37 are sealed with elastic compound after installation and leveling so that they will maintain a maximum vacuum pressure of 20 inches of mercury. The bed plate contains preferably about eighteen (5/16 inch diameter) vacuum inlet holes 38 which are connected to a common manifold by line or tubing 43. A vacuum switch is connected with small diameter tubing to sense the vacuum, outboard of the belt, for the purpose of shutting off the vacuum supply. On the surface of the center bed plate, two long steel sealing strips 37 are provided for the transverse extent of the membrane to seat against. The stripping sheet 42 is typically thin and light for ease of removability to dictate a new stripping pattern.

The top surface of the bed plates is covered with the stainless steel wire screen 41 (8 by 8 meshes per linear inch). The outboard edges of the wire screen are sealed with elastic compound and anchored beneath the steel seal strips 37. The sheet 42 is typically made of ⅛ inch aluminum plate, sectioned into three parts 42a, 42b and 42c to facilitate handling. The joints between sections are tongue and groove for alignment purposes, each section is approximately 24 inches by 40 inches. The stress risers 46, defined on the stripping sheet, are constructed of 0.03-0.06 inch steel shims, typically about ¾ inch wide by any necessary length, and protrude outboard (approximately 3/16 inch) along the perimeter of the template score. In the case of vent scores, the stress riser is placed directly beneath to straddle the score. Short stress risers are located beneath each vent score to open them subsequent to the template score. This is essentially what a man does with his memory (experience), dexterity, visual feedback and sense of feel. The stripping sheet contains a plurality of ¼ inch diameter holes 44, adjacent to the edges of the contemplated glass bracket, and are spaced approximately 5 inches apart.

An important feature of the stripping sheet 42 is vested in the ability to rapidly develop a stres riser pattern in the glass for a particular part configuration. The annular stress riser stresses each portion of the template score sufficiently to open the score and at the same time restrict movement of the trim after the score is opened to prevent chip damage. At reverse curves (such as at 53), an inflection point is reached where reverse stress is necessary to break the score along the inwardly curved portion 53. A stress riser 54 is placed outwardly of the score to guide rather than to create stress by restricting bending motion. This eliminates chipping from abrasion. A fulcrum line 70 theoretically extends from the extremities of the inward curve 53.

The stripping sheet does not require set up time because the stress riser shims are integrated on the aluminum sheet stock to retain the developed stress riser pattern indefinitely. Thus, the repeatability of stripping is very good and part changes are effected by merely removing one stripping sheet and inserting a predetermined sheet for the new part to be stripped.

The membrane assembly in detail consists of a rectangular steel frame 35 hinged at 71 on the backside of the machine at station three and has a thick closed cell neoprene strip 72 fastened to the underside of the frame. Joints about this strip are sealed (as at 73) to prevent air leakage. Under the neoprene membrane and covering the entire body surface of the frame, there is a layer of porous cotton ply belting 50.

Scoring

The difference between shallow fissured and deep fissured (pressure cut) scores is of interest with respect to this invention. Based on the developmment work for this invention, the difference between the two lies in the difference in the stress level produced in he glass during scoring and allows for easier placement of risers to result in stripping according to this invention.

During scoring, a primary fissure 60 (see FIGS. 6 and 7) and two side fissures 61 and 62 are produced. During the generation of these fissures, cutting lubricant and perhaps bits of glass may enter the score 64 and fissures generating a state of stress in the glass along the score which additionally places the glass layer 67 in compression. This adds to the state of stress resulting from ordinary glass cooling. The induced compression, whether it is caused by hydroscopic forces or particles of glass wedged into the fissures at the surface of the glass, place the primary or normal fissure 60 in tension. If the induced surface compression is a result of a low level state of stress from the scoring tool, the primary or normal fissure 60 will be shallow. Since glass will only break in tension, it is necessary to provide additional force to generate a tension at the root of the normal fissure for stripping. This type of score has a shallow normal fissure 60 which is prevented from propagating through the thickness of the glass by the surface compression layer 63 which contains the fissure. The depth of a vent (shallow) score primary fissure varies from 0.008 inch to 0.030 inch until ancillarry forces are applied.

If the primary or normal fissure 60 is placed in tension, such as by high pressure template scoring, it propagates into the center tension zone 74 of the glass; it propagates at a very high speed until it encounters the compression layer or zone 65 adjacent to the far surface 66. As soon as the fissure encounters glass in the compression state of stress, propagation ceases. On the other hand, a pressure cut and score is one which contains a high level compressive state in the score. Here the surface compression forces are sufficient to keep the normal fissure in tension until it propagates into the center tension zone of the glass. The deep fissured score also can be opened by only slight auxiliary bending forces.

Shallow fissured scores are produced by low scoring forces (4-28 lbs. of force) on the cutting wheel and deep fissured (pressure cut) scores are produced when high forces (28-50 lbs.) are applied to the wheel. In addition to the difference in applied force, shallow fissured cuts are generally made with a sharp angled wheel (125° to 145° included angle) and pressure cuts are made with wheels which range from 148°-160°.

We claim:
1. A method of cutting a glass bracket, comprising:
   a. firstly scoring one surface of said bracket at least at one location by the use of low pressure,
   b. secondly scoring said one surface along another location utilizing high pressure, said high pressure scoring being carried out to pass inside of and transverse to the extent of said low pressure scoring, and
   c. while supporting the unscored surface of said bracket on a porous member having stress risers arranged adjacent said scored locations, subjecting the entire scored surface of said bracket to a membrane drawn uniformly downwardly against said bracket by vacuum pressure communicating through said porous member, said membrane causing said bracket to be severed at said secondly scored location in advance of severence at said firstly scored location.

2. The method as in claim 1, in which the steps thereof are carried out at separate processing stations.

3. The method as in claim 2, in which said glass bracket is carried by a canvas cloth belt between said processing stations and is useful in permitting said vacuum to penetrate therethrough for drawing said membrane.

4. The method as in claim 2, in which said porous member with stress risers is provided by an interchangeable porous stripping sheet having projections extending upwardly therefrom in a predetermined pattern.

5. The method as in claim 4, in which said stripping sheet is suported by a rigid bed, and a wire mesh is interposed between said stripping sheet and said bed to assist in the distribution of the vacuum pressure to said membrane.

6. A method as in claim 1, in which the high pressure score is annular with a reversely curved portion to define a template, the stress risers for said high pressure score being arranged adjacent to and inboard of said annular score except for said reversely curved portion.

7. A method as in claim 1, in which said low pressure score is provided by a scoring wheel urged against said bracket with a force in the range of 4-28 lbs., the resulting low pressure score having a primary fissure extending substantially through only the top compression layer of said bracket and having scoring debris in said fissure to induce tension in said layer, said stress risers for said low pressure score being located directly beneath so that the auxiliary bending force created by said vacuum membrane in addition to the induced tension cause a clear opening of the score.

* * * * *